United States Patent
Wang et al.

(10) Patent No.: US 11,949,148 B2
(45) Date of Patent: Apr. 2, 2024

(54) NFC ANTENNA AND ELECTRONIC APPARATUS

(71) Applicant: Huawei Technologies Co., Ltd., Shenzhen (CN)

(72) Inventors: Yuhui Wang, Shenzhen (CN); Kemeng Wang, Wuhan (CN); Guoqiang Liu, Dongguan (CN); Weiyong Huang, Taipei (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 17/294,265

(22) PCT Filed: Nov. 13, 2019

(86) PCT No.: PCT/CN2019/117931
§ 371 (c)(1),
(2) Date: May 14, 2021

(87) PCT Pub. No.: WO2020/098684
PCT Pub. Date: May 22, 2020

(65) Prior Publication Data
US 2022/0006172 A1    Jan. 6, 2022

(30) Foreign Application Priority Data
Nov. 16, 2018   (CN) .......................... 201811373647.3

(51) Int. Cl.
*H01Q 1/22*     (2006.01)
*G06F 1/16*     (2006.01)
*H01Q 7/00*     (2006.01)

(52) U.S. Cl.
CPC .......... *H01Q 1/2266* (2013.01); *G06F 1/1662* (2013.01); *G06F 1/1681* (2013.01); *H01Q 7/00* (2013.01)

(58) Field of Classification Search
CPC .......... H01Q 1/2266; H01Q 7/00; H01Q 1/44; H01Q 1/2258; H01Q 1/36; G06F 1/1662; G06F 1/1681; H04B 5/0081
See application file for complete search history.

(56) References Cited

U.S. PATENT DOCUMENTS

| | | | |
|---|---|---|---|
| 7,999,748 B2 | 8/2011 | Ligtenberg et al. | |
| 8,907,858 B2 * | 12/2014 | Yang | H01Q 1/2266 |
| | | | 343/866 |
| 9,768,835 B2 * | 9/2017 | Tamura | H04B 5/0031 |

(Continued)

FOREIGN PATENT DOCUMENTS

| | | |
|---|---|---|
| CN | 204179224 U | 2/2015 |
| CN | 104536314 A | 4/2015 |

(Continued)

*Primary Examiner* — Seung H Lee
(74) *Attorney, Agent, or Firm* — Conley Rose, P.C.

(57) ABSTRACT

A Near-Field Communication (NFC) antenna and an electronic apparatus include a metal structure on a personal computer (PC), an inductor, a capacitor, and an NFC chip. One end of the metal structure on the PC is coupled to one end of the inductor. The other end of the inductor is coupled to one port of the NFC chip and one end of the capacitor. The other end of the metal structure on the PC is coupled to the other port of the NFC chip and the other end of the capacitor.

20 Claims, 10 Drawing Sheets

(56) References Cited

U.S. PATENT DOCUMENTS

| | | |
|---|---|---|
| 2014/0203988 A1 | 7/2014 | Yang et al. |
| 2014/0340315 A1 | 11/2014 | Ikeda et al. |
| 2015/0146357 A1* | 5/2015 | Chang .................. H01Q 7/06 |
| | | 361/679.09 |
| 2015/0280310 A1 | 10/2015 | Lee |
| 2016/0181857 A1 | 6/2016 | Konanur et al. |
| 2016/0224975 A1 | 8/2016 | Na et al. |
| 2017/0272127 A1 | 9/2017 | Jang et al. |
| 2018/0287241 A1 | 10/2018 | Kumar |
| 2018/0331416 A1* | 11/2018 | Yu ......................... H01Q 5/314 |
| 2019/0288542 A1 | 9/2019 | Konanur et al. |

FOREIGN PATENT DOCUMENTS

| | | |
|---|---|---|
| CN | 105379136 A | 3/2016 |
| CN | 107221738 A | 9/2017 |

* cited by examiner

NFC ANTENNA AND ELECTRONIC APPARATUS

CROSS-REFERENCE TO RELATED APPLICATIONS

This application is a U.S. National Stage of International Patent Application No. PCT/CN2019/117931 filed on Nov. 13, 2019, which claims priority to Chinese Patent Application No. 201811373647.3 filed on Nov. 16, 2018, both of which are hereby incorporated by reference in their entireties.

TECHNICAL FIELD

This application relates to the field of communications technologies, and in particular, to an NFC antenna and an electronic apparatus.

BACKGROUND

With development of human society, users have higher requirements for high-speed wireless information transmission. Wireless communications technologies also develop rapidly, and wireless communication capacities increase continuously. In addition, wireless communication also brings more portability to people. As an important force in the field of secure payment, a near field communication (near field communication, NFC) technology has progressed with terminal technology innovations. With spread of the NFC technology, the NFC technology has now been extended to the field of personal computers (personal computer, PC) and is to surely bring innovations to advancement and development of PC technologies. A design language of mobile terminals (such as mobile phones) is applied to the field of PCs. This poses great challenges to implementation of NFC antennas on PCs. Main challenges are as follows: (1) A full-metal body limits antenna design. (2) A bezel-less screen and ultra-thin design prevent an NFC antenna from being placed on a backpanel of a display. In an existing design solution, although the NFC antenna is greatly improved, performance of the NFC antenna cannot be ensured, and an ID appearance effect of a PC is affected.

SUMMARY

Embodiments of this application provide an NFC antenna and an electronic apparatus, to ensure performance of an NFC antenna, and improve an ID appearance effect of a PC.

According to a first aspect, an embodiment of this application provides an NFC antenna, including a metal structure on a PC, an inductor, a capacitor, and an NFC chip. One end of the metal structure on the PC is connected to one end of the inductor. The other end of the inductor is connected to one port of the NFC chip and one end of the capacitor. The other end of the metal structure on the PC is connected to the other port of the NFC chip and the other end of the capacitor. The NFC antenna is constructed by using a unique metal structure on the PC, thereby not only ensuring reliability of the NFC antenna, but also improving appearance of the PC.

In a possible design, a length of the metal structure on the PC is not less than 15 mm.

In another possible design, the metal structure on the PC is a balanced metal link bar in each key area on a keyboard. The NFC antenna is constructed by using a unique balanced metal link bar that is on the PC and that is used to support each keycap, thereby not only ensuring reliability of the NFC antenna, but also improving appearance of the PC.

In another possible design, the balanced metal link bar is disposed under each keycap on the keyboard, and is on the top of a metal cavity including a metal shell of a keyboard key and a metal shell of a keyboard bottom plate.

In another possible design, the balanced metal link bar may include an inner coil and a secondary inner coil in a space bar area. One end of the inner coil is connected to one end of the secondary inner coil. The other end of the inner coil is connected to one port of the NFC chip. The other end of the secondary inner coil is connected to the other port of the NFC chip. The inner coil and the secondary inner coil are connected in a wire wound coil shape, the inner coil and the secondary inner coil are connected in a wire wound coil form. The NFC antenna is constructed by connecting segmented balanced metal link bars to form a wire wound coil to generate a wire wound inductance.

In another possible design, the secondary inner coil is connected to a port of the NFC chip by using a conductor. The conductor crosses the inner coil and is not in conduction with the inner coil.

In another possible design, the balanced metal link bar may be an outer coil in a space bar area.

In another possible design, the outer coil includes an upper coil part and a lower coil part. One end of the upper coil part is connected to one port of the NFC chip, and the other end of the upper coil part is connected to the other port of the NFC chip, to construct the NFC antenna. Alternatively, one end of the lower coil part is connected to one port of the NFC chip, and the other end of the lower coil part is connected to the other port of the NFC chip, to construct the NFC antenna.

In another possible design, one end of the upper coil part is connected to one end of the lower coil part, the other end of the upper coil part is connected to one port of the NFC chip, and the other end of the lower coil part is connected to the other port of the NFC chip. The upper coil part and the lower coil part are connected to form a metal structure, and the NFC antenna is constructed by using the metal structure.

In another possible design, an area of a cabling area of the balanced metal link bar is greater than 50 mm×10 mm, but is not limited to the area. An area of a cabling area of the NFC antenna may be adjusted based on an actual structure, to implement optimal performance of the NFC antenna.

In another possible design, the metal structure on the PC may include two metal hinges, a metal component of a display, and a metal component of a keyboard host, and the two metal hinges include a first metal hinge and a second metal hinge. The first metal hinge is electrically connected to the metal component of the display, the metal component of the display is electrically connected to the second metal hinge, and the second metal hinge is electrically connected to the metal component of the keyboard host. The NFC antenna is constructed by using a unique metal hinge on the PC, the metal component of the display, and the metal component of the keyboard host, thereby not only ensuring reliability of the NFC antenna, but also improving appearance of the PC.

In another possible design, the metal component of the display may be a metal hinge cover (hinge cover) or a metal shell of the display.

In another possible design, the metal component of the keyboard host may be a metal cover of the keyboard host.

According to a second aspect, an embodiment of this application further provides an electronic apparatus, including the foregoing NFC antenna, where a signal is received or a signal is sent by using the foregoing NFC antenna.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1:
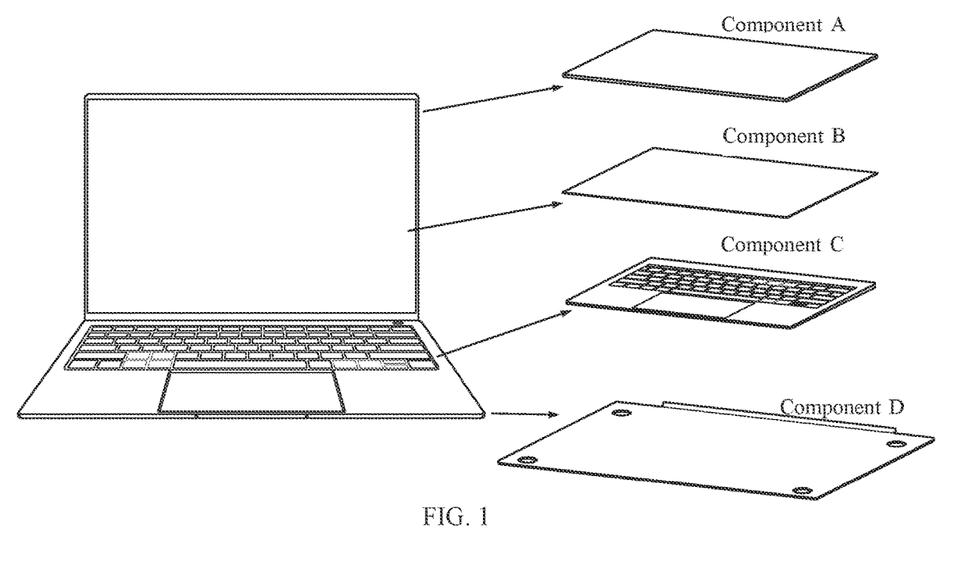
FIG. 1 is a schematic diagram of a basic architecture of a PC.

FIG. 1 is a schematic diagram of a basic architecture of a PC. The PC may include a display and a keyboard host. The display includes a display backplane (component A) and a display front end (component B). The keyboard host includes a keyboard host upper shell (component C) and a keyboard host bottom panel (component D). The component A, the component B, the component C, and the component D are arranged sequentially from top to bottom. The display and the keyboard host are connected by a using a hinge (hinge).

Figure 2:
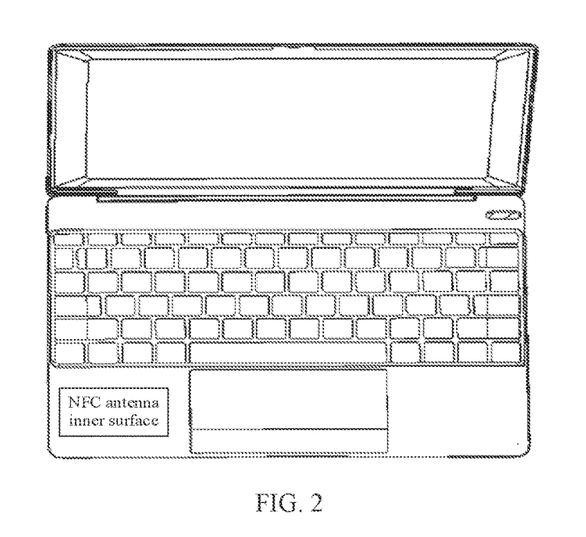
FIG. 2 is a schematic diagram of an NFC antenna.

FIG. 2 is a schematic diagram of an NFC antenna. The NFC antenna is disposed at a palm rest location and is located on an inner side of the component C. A shell of the component C is plastic. The NFC antenna is implemented in a form of a flexible printed circuit board (flexible printed circuits board, FPC). Such an NFC antenna is commonly designed on a rear battery cover of a mobile phone. However, because the NFC antenna is disposed at the palm rest location, and an area of the NFC antenna is relatively large, the shell of the component C is required to have a large area of plastic or partial plastic, seriously affecting ID aesthetics.

Figure 3:
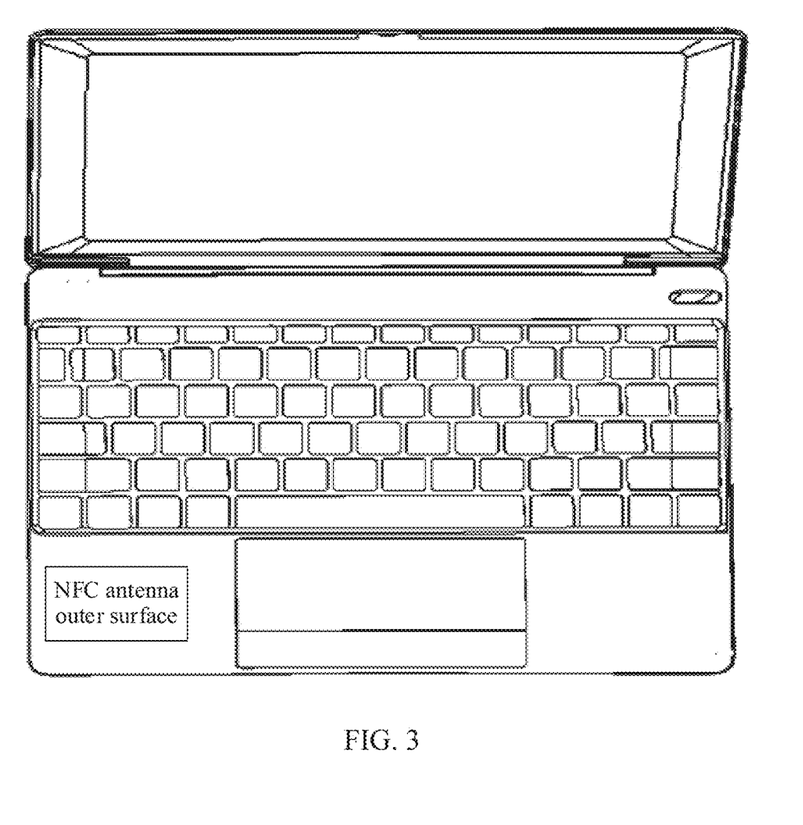
FIG. 3 is a schematic diagram of another NFC antenna.

FIG. 3 is a schematic diagram of another NFC antenna. The NFC antenna is disposed at a palm rest location and is located on an outer side of the component C. The component C is all metal and does not need to be split and open. The NFC antenna uses a conventional aluminum foil antenna design to help increase an amount of ferrite and improve a sensing distance. However, the NFC antenna is disposed on an appearance surface of an ID. This is not conducive to aesthetic design of the ID. In addition, the NFC antenna is located at the palm rest location, and a user often presses with a palm at the palm rest location. As a result, use reliability of the NFC antenna cannot be ensured.

Figure 4:
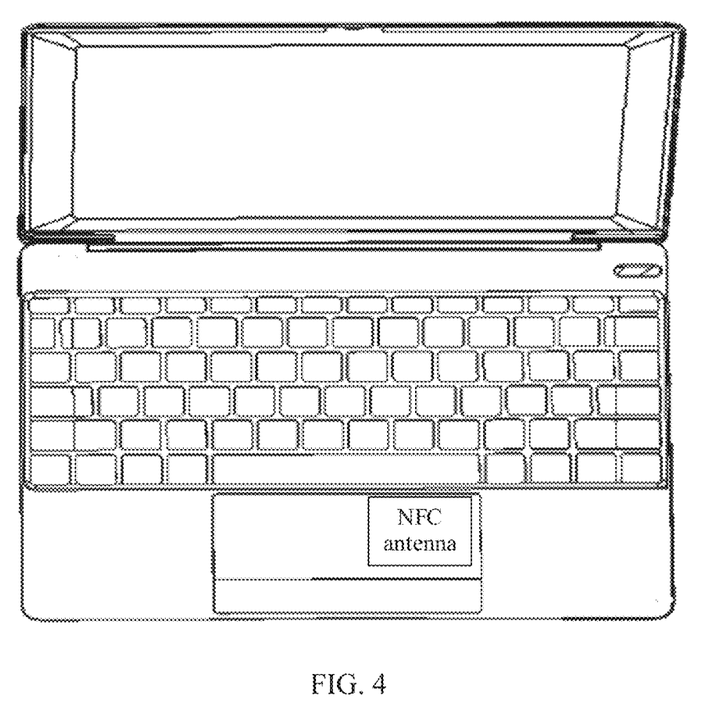
FIG. 4 is a schematic diagram of still another NFC antenna.

FIG. 4 is a schematic diagram of still another NFC antenna. The NFC antenna is disposed in an area of a touchpad and is located at a location below the touchpad, and an area of a cabling area of the NFC antenna is greater than 60 mm×15 mm. The NFC antenna is located in a metal cavity and surrounded by metal on five sides, and a sensing distance is short, resulting in low reliability of the NFC antenna. In addition, the NFC antenna is disposed in the area of the touchpad, resulting in a decrease in an effective use area of the touchpad, and affecting a use effect of the touchpad.

Figure 5:
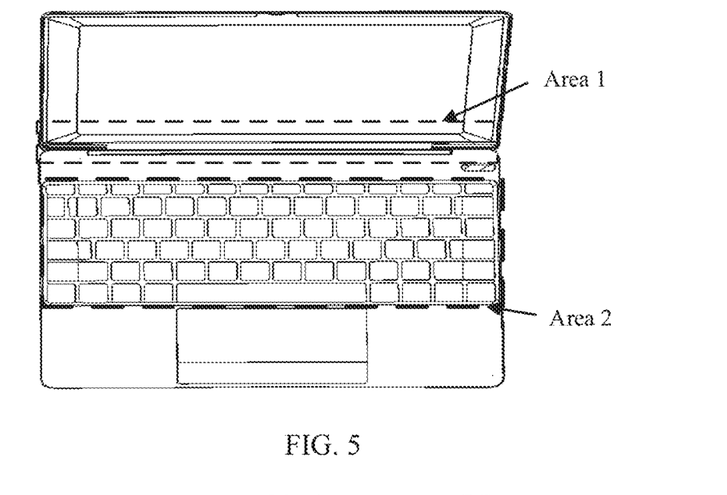
FIG. 5 is a schematic diagram of a construction area of an NFC antenna according to an embodiment of this application.
Figure 6:
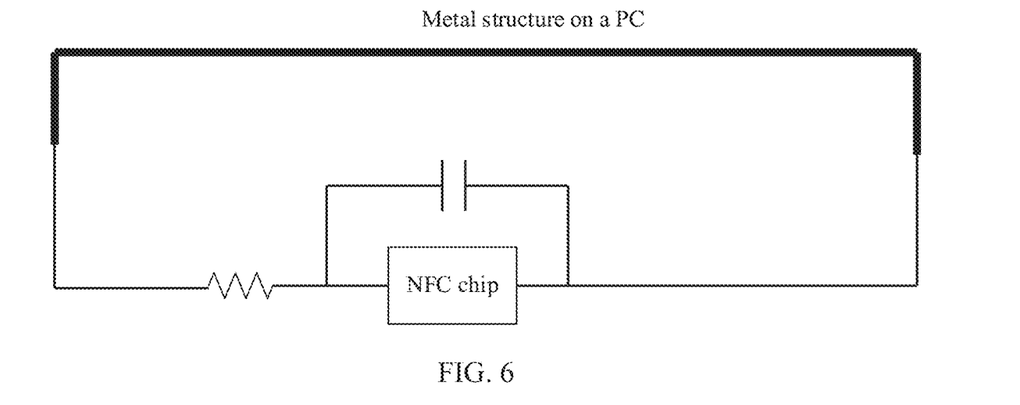
FIG. 6 is a schematic diagram of a circuit of an NFC antenna according to an embodiment of this application.

In conclusion, there are two design solutions for a layout of the NFC antenna on the PC. First, the NFC antenna is disposed at the palm rest location of the C shell. This affects an overall ID appearance effect of the PC. Second, the NFC antenna is disposed in the touchpad area. This affects the use effect of the touchpad, and use reliability of the NFC antenna is low. To resolve the foregoing technical problem, the embodiments of this application provide the following solutions:

FIG. 5 is a schematic diagram of a construction area of an NFC antenna according to an embodiment of this application. The NFC antenna may be constructed by using a metal structure in an area 1 or a metal structure in an area 2 on a PC shown in FIG. 5, but it is not limited to constructing the NFC antenna by using a metal structure in the foregoing area. FIG. 6 is a schematic diagram of a circuit of an NFC antenna according to an embodiment of this application. One end of the metal structure on the PC is connected to one end of an inductor. The other end of the inductor is connected to one port of an NFC chip and one end of a capacitor. The other end of the metal structure on the PC is connected to the other port of the NFC chip and the other end of the capacitor. A length of the metal structure on the PC is not less than 15 mm.

Figure 7:
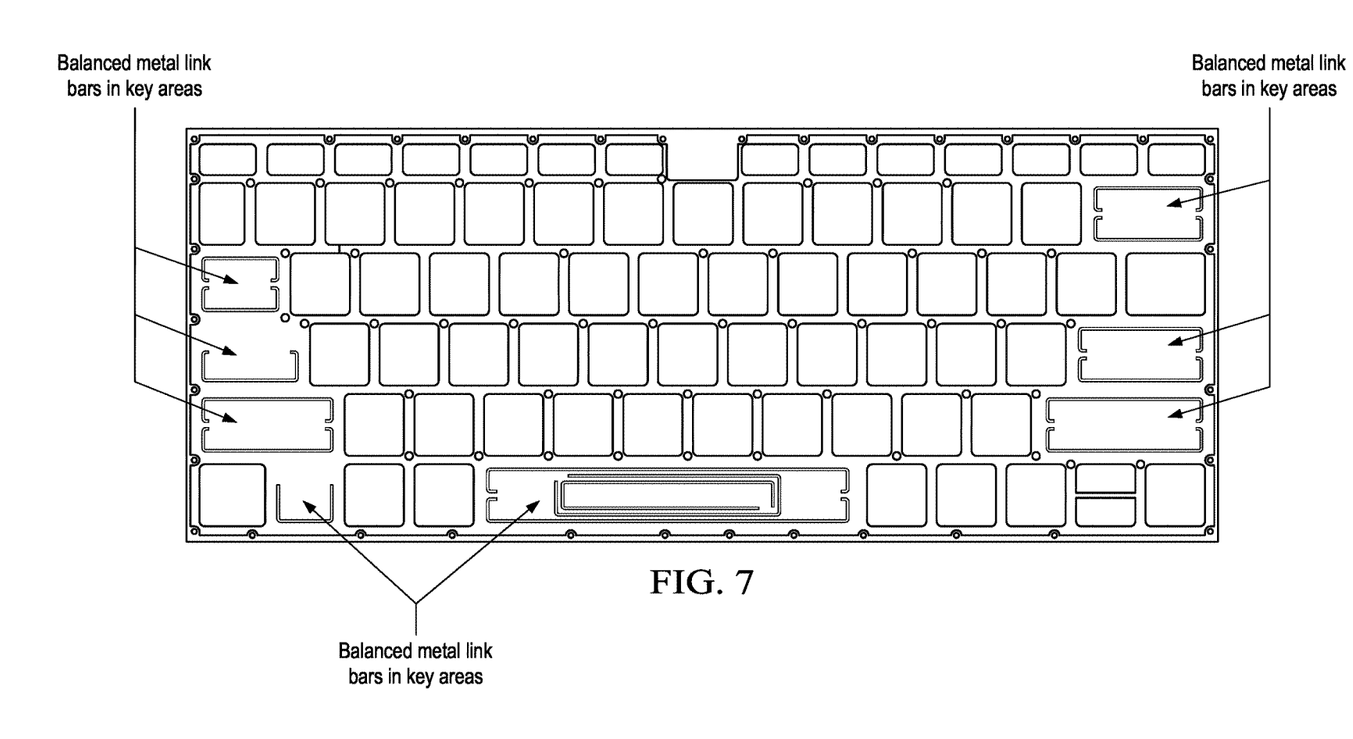
FIG. 7 is a schematic diagram of a metal structure on a PC according to an embodiment of this application.
Figure 8A:
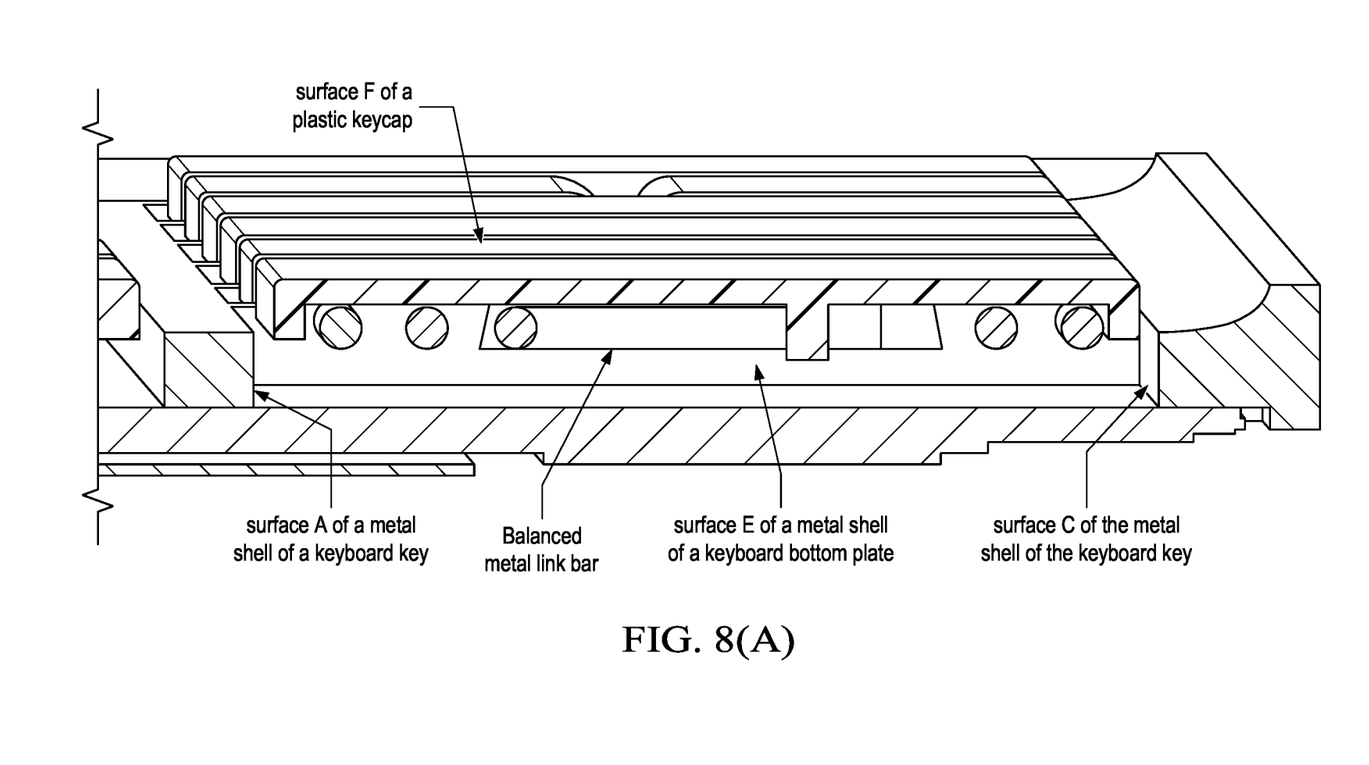
FIG. 8(A) is a cross-sectional view of a keyboard host according to an embodiment of this application.
Figure 8B:
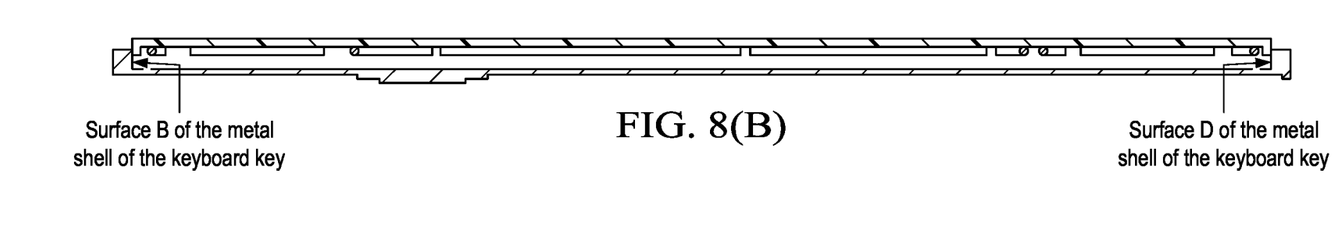
FIG. 8(B) is a cross-sectional view of another keyboard host according to an embodiment of this application.

In one embodiment, the NFC antenna may be constructed by using a balanced metal link bar (link bar) in each key area on the PC. As shown in FIG. 7, the metal structure on the PC may be a balanced metal link bar (link bar) in each key area on a keyboard in the area 2 shown in FIG. 5. The balanced metal link bar may be a metal coil in any key area such as a space bar, a tab key, a shift key, an enter key, or a delete key, on the keyboard. The balanced metal link bar is used to support each keycap. FIG. 8(A) and FIG. 8(B) are each a cross-sectional view of a keyboard host according to an embodiment of this application. FIG. 8 (A) is a cross-sectional view along the key, and FIG. 8 (B) is a cross-sectional view along the key. The keyboard host includes each keycap, a metal shell of a keyboard key, and a metal shell of a keyboard bottom plate that are all located on a component C of the keyboard host. The metal shell of the keyboard key includes a surface A of the metal shell of the keyboard key, a surface B of the metal shell of the keyboard key, a surface C of the metal shell of the keyboard key, and a surface D of the metal shell of the keyboard key. The balanced metal link bar is disposed under the keycap and on top of a metal cavity formed by the metal shell of the keyboard key and the metal shell of the keyboard bottom. Each keycap may be plastic.

When the metal structure on the PC is a balanced metal link bar, for a circuit of the NFC antenna, refer to FIG. 6. A balanced metal link bar in any key area on the keyboard may be selected. One end of the balanced metal link bar is connected to one end of the inductor. The other end of the inductor is connected to one port of the NFC chip and one end of the capacitor. The other end of the balanced metal link bar is connected to the other port of the NFC chip and the other end of the capacitor.

Figure 9A:
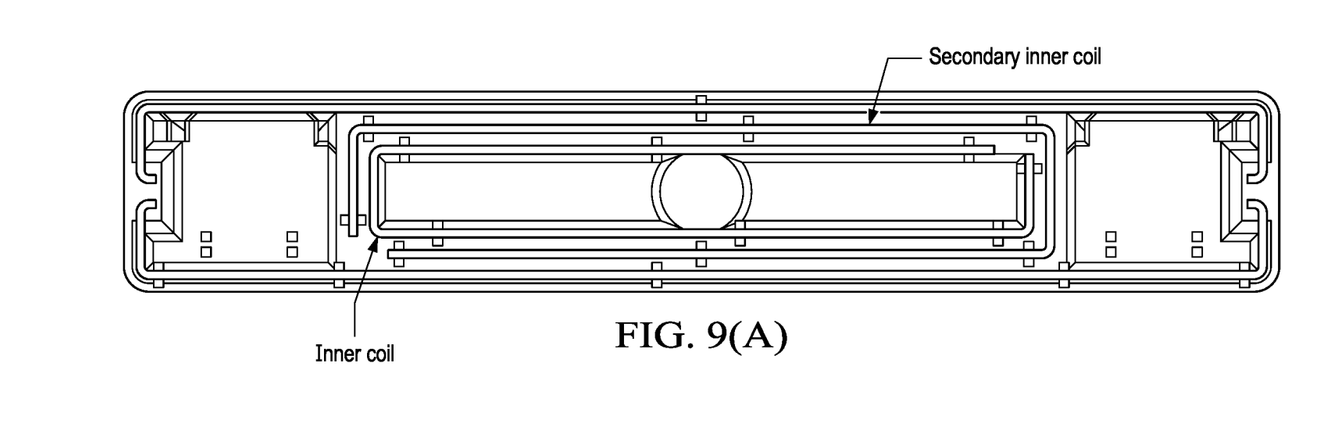
FIG. 9(A) is a schematic structural diagram of a space bar before reconstruction.
Figure 9B:
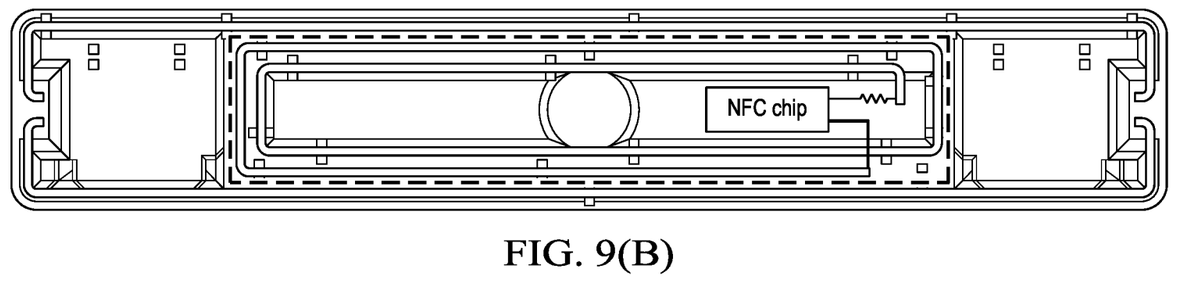
FIG. 9(B) is a schematic structural diagram of a space bar after reconstruction according to an embodiment of this application.

For example, FIG. 9(A) is a schematic structural diagram of a space bar before reconstruction. The balanced metal link bar may include an inner coil and a secondary inner coil. The inner coil and the secondary inner coil are segmented and not connected, and each of the inner coil and the secondary inner coil has an opening. FIG. 9(B) is a schematic structural diagram of a space bar after reconstruction according to an embodiment of this application. One end of the inner coil is connected to one end of the secondary inner coil. The other end of the inner coil is connected to one port of the NFC chip. The other end of the secondary inner coil is connected to the other port of the NFC chip. The inner coil and the secondary inner coil are connected in a form of a wire wound coil. That is, the inner coil and the secondary inner coil are connected into one wire wound coil, to form a metal wire wound structure in a form of a wire wound inductor. The metal wire wound structure is used as a part of the NFC antenna. The secondary inner coil is connected to a port of the NFC chip by using a conductor. The conductor crosses the inner coil and is not in conduction with the inner coil.

Optionally, as shown in FIG. 9(B), a wire wound coil (an inner coil and a secondary inner coil) of the balanced metal link bar forms a cabling area (a dashed line area) of the NFC antenna, and an area of the cabling area of the NFC antenna is greater than 50 mm×10 mm, but is not limited to the area. The area of the cabling area of the NFC antenna may be adjusted based on an actual structure, to achieve optimal performance of the NFC antenna.

Figure 9C:
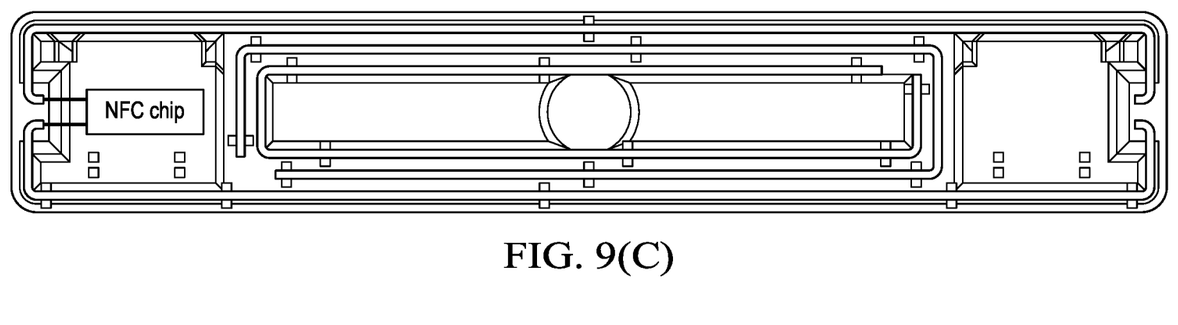
FIG. 9(C) is a schematic structural diagram of another space bar after reconstruction according to an embodiment of this application.

For another example, as shown in FIG. 9(A), alternatively, the balanced metal link bar may be an outer coil in a space bar area. The outer coil includes an upper coil part and a lower coil part. The upper coil part and the lower coil part are independent of each other and are not connected. One end of the upper coil part may be connected to one port of the NFC chip, and the other end of the upper coil part may be connected to the other port of the NFC chip, to construct the NFC antenna. Alternatively, one end of the lower coil part is connected to one port of the NFC chip, and the other end of the lower coil part is connected to the other port of the NFC chip, to construct the NFC antenna. FIG. 9(C) is a schematic structural diagram of another space bar after reconstruction according to an embodiment of this application. One end of the upper coil part is connected to one end of the lower coil part. The other end of the upper coil part is connected to one port of the NFC chip. The other end of the lower coil part is connected to the other port of the NFC chip. The upper coil part and the lower coil part are connected to form a metal structure, and the NFC antenna is constructed by using the metal structure.

Figure 10:
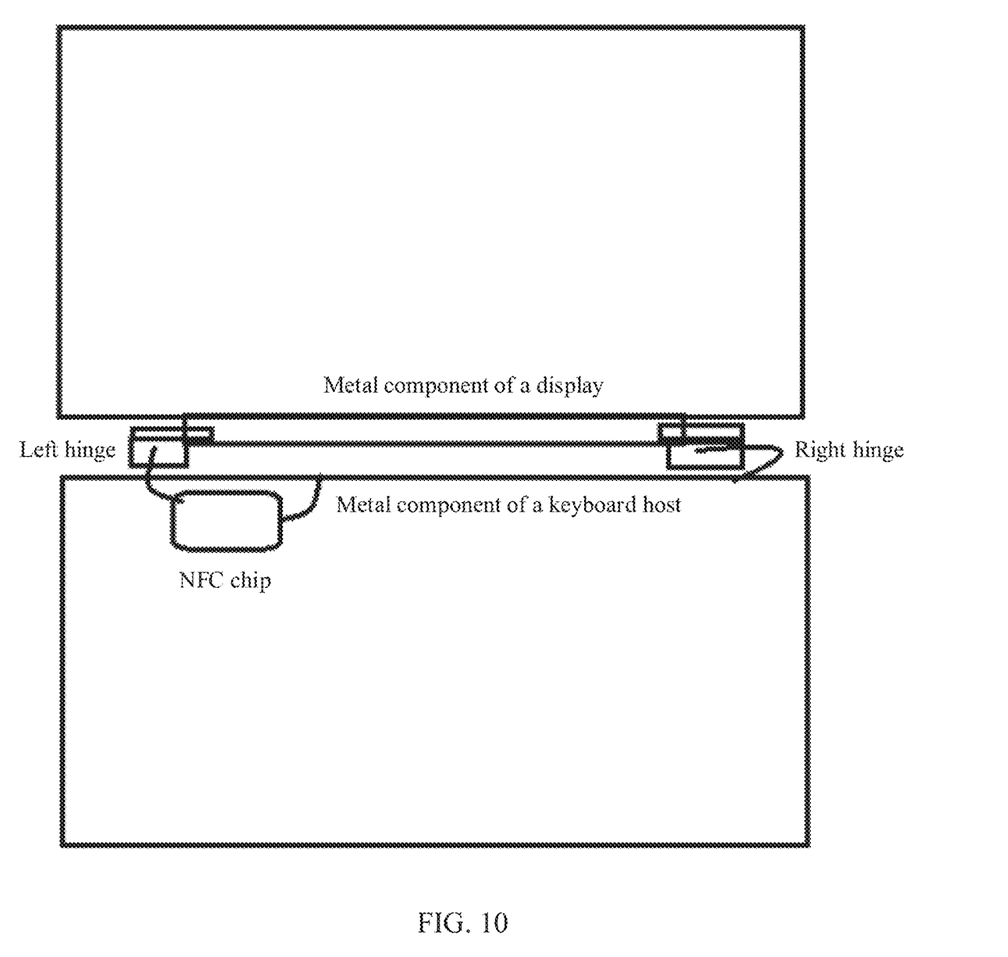
FIG. 10 is a schematic diagram of another metal structure on a PC according to an embodiment of this application.

In another embodiment, the NFC antenna may be constructed by using a metal hinge that is on the PC and that is used to connect the keyboard host and the display, a metal component that is of the display and that is located on the component B, and a metal component that is of the keyboard host and that is located on the component C. As shown in FIG. 10, the metal structure on the PC may include two metal hinges in the area 1 shown in FIG. 5, the metal component of the display, and the metal component of the keyboard host, and the two metal hinges include a first metal hinge (a left hinge) and a second metal hinge (a right hinge). The first metal hinge is electrically connected to the metal component of the display, the metal component of the display is electrically connected to the second metal hinge, and the second metal hinge is electrically connected to the metal component of the keyboard host. The metal component of the display may be a metal hinge cover (hinge cover) or a metal shell of the display. The metal component of the keyboard host may be a metal cover of the keyboard host.

Figure 11:
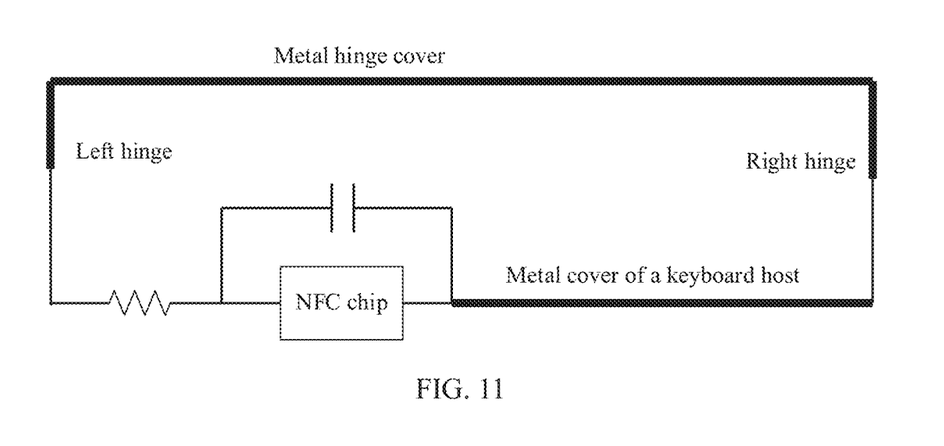
FIG. 11 is a schematic diagram of another circuit of an NFC antenna according to an embodiment of this application.

FIG. 11 is a schematic diagram of another circuit of an NFC antenna according to an embodiment of this application. An NFC chip is connected to a capacitor and an inductor. The NFC chip feeds power to a left hinge. The left hinge is electrically connected to a right hinge by using a metal hinge cover or a metal shell of a display. The right hinge is grounded to a metal cover of a keyboard host to form a distributed inductor, to form an NFC antenna with the inductor, the capacitor, and the NFC chip.

In this embodiment of this application, the NFC antenna may be constructed by using a unique metal structure on a PC, such as a balanced metal link bar, a metal hinge, a metal component of the display, and a metal component of the keyboard host, to ensure performance of the NFC antenna, and improve an ID appearance effect of the PC.

An embodiment of this application further provides an electronic apparatus, including the foregoing NFC antenna, where a signal is received or a signal is sent by using the foregoing NFC antenna.

The foregoing descriptions are merely specific implementations of this application, but are not intended to limit the protection scope of this application. Any variation or replacement readily figured out by a person skilled in the art witmay hin the technical scope shall fall within the protection scope of this application. Therefore, the protection scope of this application shall be subject to the protection scope of the claims.

The invention claimed is:

1. A Near-Field Communication (NFC) antenna comprising:
 a metal structure on a personal computer (PC) comprising:
  a first end; and
  a second end;
 an inductor comprising:
  a third end coupled to the first end; and
  a fourth end;
 an NFC chip comprising:
  a first port coupled to the fourth end; and
  a second port coupled to the second end; and
 a capacitor comprising:
  a fifth end coupled to the fourth end; and
  a sixth end coupled to the second end.

2. The NFC antenna of claim 1, wherein the metal structure on the PC comprises a balanced metal link bar configured to dispose in a key area on a keyboard.

3. The NFC antenna of claim 2, wherein the balanced metal link bar is configured to dispose under a keycap in the key area and on a top of a metal cavity, and wherein the metal cavity comprises a metal shell of a keyboard key and a metal shell of a keyboard bottom plate.

4. The NFC antenna of claim 2, wherein the balanced metal link bar further comprises:
   an inner coil comprising:
      a seventh end; and
      an eighth end coupled to the first port; and
   a secondary inner coil coupled to the inner coil in the form of a wire wound coil and further comprising:
      a ninth end coupled to the seventh end; and
      a tenth end coupled to the second port.

5. The NFC antenna of claim 4, wherein a cabling area of the balanced metal link bar is greater than about 50 millimeters (mm)×10 mm.

6. The NFC antenna of claim 2, wherein the balanced metal link bar comprises an outer coil in the key area.

7. The NFC antenna of claim 2, wherein the key area comprises a space bar area.

8. The NFC antenna of claim 1, wherein the metal structure on the PC comprises two metal hinges configured to couple a keyboard host, a display, a first metal component of the display, and a second metal component of the keyboard host, and wherein the two metal hinges further comprise:
   a first metal hinge electrically coupled to the first metal component; and
   a second metal hinge electrically coupled to the first metal component and the second metal component.

9. The NFC antenna of claim 8, wherein the first metal component comprises a metal hinge cover or a metal shell of the display.

10. The NFC antenna of claim 8, wherein the second metal component comprises a metal cover of the keyboard host.

11. An electronic apparatus comprising:
   a Near-Field Communication (NFC) antenna comprising:
      a metal structure on a personal computer (PC) comprising:
         a first end; and
         a second end;
      an inductor comprising:
         a third end coupled to the first end; and
         a fourth end;
      an NFC chip comprising:
         a first port coupled to the fourth end; and
         a second port coupled to the second end; and
      a capacitor comprising:
         a fifth end coupled to the fourth end; and
         a sixth end coupled to the second end.

12. The electronic apparatus of claim 11, wherein the metal structure on the PC comprises a balanced metal link bar configured to dispose in a key area on a keyboard.

13. The electronic apparatus of claim 12, wherein the balanced metal link bar is configured to dispose under a keycap in the key area and on a top of a metal cavity, wherein the metal cavity comprises a metal shell of a keyboard key and a metal shell of a keyboard bottom plate.

14. The electronic apparatus of claim 12, wherein the balanced metal link bar further comprises:
   an inner coil comprising:
      a seventh end; and
      an eighth end coupled to the first port; and
   a secondary inner coil coupled to the inner coil in the form of a wire wound coil and further comprising:
      a ninth end coupled to the seventh end; and
      a tenth end coupled to the second port.

15. The electronic apparatus of claim 14, wherein a cabling area of the balanced metal link bar is greater than about 50 millimeters (mm)×10 mm.

16. The electronic apparatus of claim 12, wherein the balanced metal link bar comprises an outer coil in the key area.

17. The electronic apparatus of claim 12, wherein the key area comprises a space bar area.

18. The electronic apparatus of claim 11, wherein the metal structure on the PC comprises two metal hinges configured to couple a keyboard host, a display, a first metal component of the display, and a second metal component of the keyboard host, wherein the two metal hinges further comprise:
   a first metal hinge electrically coupled to the first metal component; and
   a second metal hinge electrically coupled to the first metal component and the second metal component.

19. The electronic apparatus of claim 18, wherein the first metal component comprises a metal hinge cover or a metal shell of the display.

20. The electronic apparatus of claim 18, wherein the second metal component comprises a metal cover of the keyboard host.

* * * * *